US010433700B2

(12) United States Patent
Yang et al.

(10) Patent No.: US 10,433,700 B2
(45) Date of Patent: Oct. 8, 2019

(54) MULTI-PURPOSE TOUGH STAIN REMOVAL ARTICLES

(71) Applicant: Kimberly-Clark Worldwide, Inc., Neenah, WI (US)

(72) Inventors: Kaiyuan Yang, Cumming, GA (US); Carl Gerard Rippl, Appleton, WI (US); Gregory Daniel Samek, Roswell, GA (US); Joel Brostin, Alpharetta, GA (US); Joseph Kenneth Baker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 364 days.

(21) Appl. No.: 14/091,993

(22) Filed: Nov. 27, 2013

(65) Prior Publication Data

US 2015/0143647 A1    May 28, 2015

(51) Int. Cl.
| | |
|---|---|
| *A47L 13/16* | (2006.01) |
| *A47L 13/17* | (2006.01) |
| *B32B 5/26* | (2006.01) |
| *B32B 5/02* | (2006.01) |

(Continued)

(52) U.S. Cl.
CPC .............. *A47L 13/16* (2013.01); *A47L 13/17* (2013.01); *B32B 5/022* (2013.01); *B32B 5/024* (2013.01); *B32B 5/026* (2013.01); *B32B 5/26* (2013.01); *B32B 7/05* (2019.01); *B32B 29/02* (2013.01); *B32B 2262/0253* (2013.01); *B32B 2262/0276* (2013.01); *B32B 2262/04* (2013.01);

(Continued)

(58) Field of Classification Search
None
See application file for complete search history.

(56) References Cited

U.S. PATENT DOCUMENTS

| | | | |
|---|---|---|---|
| 2,255,779 A * | 9/1941 | Kent | ................ D04H 11/00 156/72 |
| 4,448,704 A | 5/1984 | Barby et al. | |
| 4,837,078 A | 6/1989 | Harrington | |

(Continued)

FOREIGN PATENT DOCUMENTS

| | | | |
|---|---|---|---|
| CN | 101400510 | * | 4/2009 |
| CN | 102475513 A | | 5/2012 |

(Continued)

OTHER PUBLICATIONS

Machine translation of CN 101400510; Klaus et al., Apr. 2009.*

(Continued)

*Primary Examiner* — Shawn Mckinnon
(74) *Attorney, Agent, or Firm* — Kimberly-Clark Worldwide, Inc.

(57) ABSTRACT

A nonwoven material includes a backing substrate and a functional layer affixed to the backing substrate, the functional layer including thermal-setting fibers. The functional layer can be a nonwoven web including thermal-setting fibers, where the nonwoven web is affixed to the backing substrate. The functional layer can also include thermal-setting fibers and a thermal-setting polymer disposed on the backing substrate. The thermal-setting fibers can be melamine. Thermal-setting fibers can be rigidly fixed within the functional layer. The functional layer can further include a polymer resin.

12 Claims, 4 Drawing Sheets

(51) Int. Cl.
*B32B 29/02* (2006.01)
*B32B 7/05* (2019.01)

(52) U.S. Cl.
CPC ..... *B32B 2262/14* (2013.01); *B32B 2307/728* (2013.01); *B32B 2432/00* (2013.01)

(56) References Cited

U.S. PATENT DOCUMENTS

| | | | |
|---|---|---|---|
| 5,685,935 | A | 11/1997 | Heyer et al. |
| 5,840,338 | A | 11/1998 | Roos et al. |
| 5,914,177 | A | 6/1999 | Smith et al. |
| 6,607,636 | B2 | 8/2003 | Ross et al. |
| 6,608,118 | B2 | 8/2003 | Kosaka et al. |
| 6,761,896 | B1 | 7/2004 | Znaiden et al. |
| 6,774,063 | B2 | 8/2004 | Bouchette et al. |
| 7,030,046 | B2 | 4/2006 | Wong et al. |
| 7,381,299 | B2 | 6/2008 | Shannon et al. |
| 7,456,147 | B2 | 11/2008 | Kumar et al. |
| 7,517,582 | B2 | 4/2009 | Amundson et al. |
| 7,670,967 | B2 | 3/2010 | Runge et al. |
| 7,780,979 | B2 | 8/2010 | Hu et al. |
| 8,152,929 | B1 | 4/2012 | Perring |
| 8,603,054 | B2 | 12/2013 | Lemke et al. |
| 8,894,814 | B2 | 11/2014 | Wenzel et al. |
| 8,940,323 | B2 | 1/2015 | Shannon et al. |
| 2002/0060012 | A1* | 5/2002 | Berbner ................ C08G 14/10 162/159 |
| 2003/0175232 | A1 | 9/2003 | Elliott et al. |
| 2004/0081679 | A1 | 4/2004 | Simon et al. |
| 2005/0037079 | A1 | 2/2005 | Son et al. |
| 2005/0136238 | A1 | 6/2005 | Lindsay et al. |
| 2005/0136765 | A1 | 6/2005 | Shannon |
| 2005/0266229 | A1 | 12/2005 | Porticos et al. |
| 2005/0266752 | A1 | 12/2005 | Morin et al. |
| 2006/0005338 | A1 | 1/2006 | Ashe et al. |
| 2006/0246272 | A1 | 11/2006 | Zhang et al. |
| 2007/0088104 | A1 | 4/2007 | Hung et al. |
| 2007/0202315 | A1 | 8/2007 | Duffield et al. |
| 2007/0271719 | A1 | 11/2007 | Schindler et al. |
| 2007/0280974 | A1 | 12/2007 | Son et al. |
| 2009/0084400 | A1* | 4/2009 | Quadbeck-Seeger ..... A47L 1/15 134/6 |
| 2009/0110656 | A1 | 4/2009 | Lemke et al. |
| 2009/0124157 | A1 | 5/2009 | Garza et al. |
| 2009/0160077 | A1* | 6/2009 | Aulenta ................ C08K 5/17 264/119 |
| 2009/0199868 | A1 | 8/2009 | Cybulski et al. |
| 2010/0264353 | A1 | 10/2010 | Hartmann et al. |
| 2010/0286642 | A1 | 11/2010 | Allen, Jr. et al. |
| 2011/0088711 | A1 | 4/2011 | Bonafos |
| 2011/0117353 | A1 | 5/2011 | Henshaw et al. |
| 2011/0123578 | A1 | 5/2011 | Wenzel et al. |
| 2011/0197917 | A1 | 8/2011 | Koptis et al. |
| 2011/0217895 | A1 | 9/2011 | Peterson |
| 2012/0076972 | A1 | 3/2012 | Zhou et al. |
| 2012/0180236 | A1 | 7/2012 | Michelson et al. |
| 2013/0029933 | A1 | 1/2013 | Schnitzler et al. |
| 2013/0261266 | A1 | 10/2013 | Bunyard et al. |
| 2014/0202494 | A1* | 7/2014 | Latten ................ D01G 15/10 134/6 |
| 2015/0143647 | A1 | 5/2015 | Yang et al. |

FOREIGN PATENT DOCUMENTS

| | | | |
|---|---|---|---|
| DE | 102005038170 | * | 2/2007 |
| DE | 2007 005 648 | U1 | 7/2007 |
| DE | 102009010606 | A1 | 8/2010 |
| DE | 202008018271 | * | 8/2012 |
| DE | 102011050786 | A1 | 12/2012 |
| FR | 2930435 | A1 | 10/2009 |
| JP | 2001-310343 | A | 11/2001 |
| JP | 2005095494 | A1 | 2/2008 |
| JP | 4982101 | B2 | 7/2012 |
| KR | 101313430 | B1 | 10/2013 |
| WO | WO05065516 | A2 | 7/2005 |
| WO | WO09038030 | A1 | 3/2009 |
| WO | 13131575 | A1 | 9/2013 |

OTHER PUBLICATIONS

Machien translation of DE102005038170, Penner et al., 2007 (Year: 2007).*

Klouda et al., 'Thermoresponsive hydrogels in biomedical applictions—a review', 2011 Eur J Pharm Biopharm http://www.ncbi.nlm.nih.gov/pmc/articles/PMC3163097/ (Year: 2011).

* cited by examiner

MULTI-PURPOSE TOUGH STAIN REMOVAL ARTICLES

BACKGROUND

The general cleaning industry currently sells both dry and wet cleaning products. Wet products are essentially the simple combinations of dry substrates and liquid cleaners (e.g. liquid cleaners and impregnated wet wipes).

Marketing dry and saturated wet products separately worked well in the past when both the cleaning industry as well as the general public paid little or no attention to the potential harms to surfaces/environment/human body from using excess liquid formulations with harsh chemicals. Such harsh chemicals are particularly prevalent when tough stains need to be addressed. With a rapidly-changing cleaning landscape and an emerging green cleaning trend, continuing to stay on only dry and wet products will face different limitations for addressing these new cleaning challenges. This is particularly true for household cleaning when parents are generally very concerned about the contact between children and harsh chemicals in wet products.

One prior art attempt to provide cleaning efficacy without harsh liquids uses a layer of hardened thermosetting melamine foam (a formaldehyde-melamine-sodium bisulfite copolymer, manufactured by BASF under the name "Basotect") for its superior scrubbing properties. The melamine foam layer, however, is brittle in nature and can break down easily to leave melamine foam residues on the surface. As a result, this cleaning foam is an expensive product for consumers to use and can leave behind melamine residues.

Developing a disposable wipe or towel that can easily remove tough stains such as permanent marker ink marks on hard surfaces has long been a desired but unachievable goal in the cleaning industry. Concept testing of such products always resonates well with consumers as current tough stain removal products are not only expensive but also can be limited in their application conditions (e.g., concerns for scratching, linting, durability, etc.). There is therefore a need for an inexpensive and effective stain-removing wiping product that is handy for consumers to use.

SUMMARY

The present disclosure describes a cleaning wipe that can easily remove, for example, permanent marker ink marks on hard surfaces. It has been discovered that combinations of certain fibers and low-moisture in cleaning articles are very good at removing stains from hard surfaces.

Presented is a nonwoven material including a backing substrate and a functional layer affixed to the backing substrate, the functional layer including thermal-setting fibers. The functional layer can be a nonwoven web including thermal-setting fibers, where the nonwoven web is affixed to the backing substrate. The functional layer can also include thermal-setting fibers and a thermal-setting polymer disposed on the backing substrate. The thermal-setting fibers can be melamine. Thermal-setting fibers can be rigidly fixed within the functional layer. The functional layer can further include a polymer resin.

Also presented is a surface-cleaning wipe including a nonwoven backing substrate and a nonwoven functional layer including thermal-setting fibers, wherein the thermal-setting fibers are deposited on the backing substrate.

Also present is a cleaning article including a cleaning article sheet having a backing substrate, wherein the backing substrate includes pores therein, and wherein the backing substrate has a background moisture percentage by weight. The cleaning article also includes a functional layer including thermal-setting fibers, wherein the functional layer is affixed to the backing substrate; and liquid water disposed substantially and disconnectedly within the pores, wherein the liquid water is at moisture percentage by weight that is 5 to 150 percentage points higher than the background moisture percentage.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
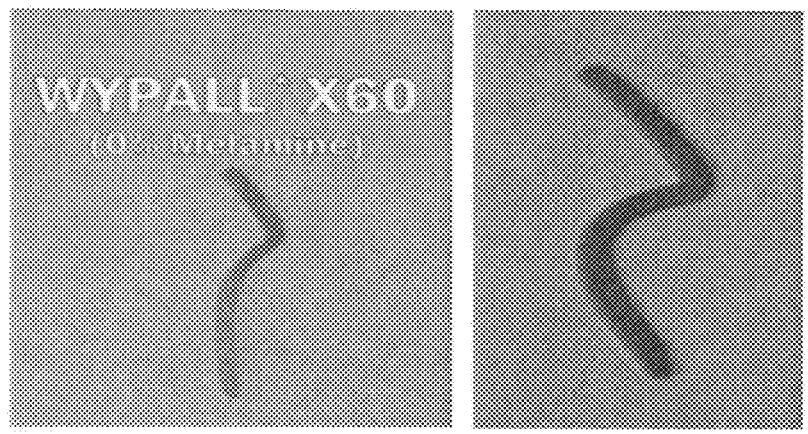
FIG. 1 illustrates the ineffectiveness in stain removal of regular paper towels and wipes, comparing a control on the right with the use of a WYPALL-X60 brand wiper on the left.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

The advance described in the present disclosure provides a multi-purpose tough stain removal wipe that was ranked as the top concept by consumer testing panelists who like the idea because: a) a disposable eraser wipe can do scrubbing and wiping simultaneously (i.e., multifunctional in comparison to a foam eraser); b) a disposable eraser wipe is perceived to leave less residue on the surface being cleaned; c) a disposable eraser wipe is perceived to be softer and gentler to household surfaces than the foams; d) a disposable eraser wipe is more resistant to pressure-induced, unrecoverable deformations and breakups than are foams; and e) a disposable eraser wipe uses much less material than foams and thus is more cost effective.

A comparison of the structures of current regular cleaning papers/wipes and of the current foam-based eraser demonstrates that regular cleaning papers/wipes are micro-structurally soft due to flexible thermoplastic or cellulosic fibers with flexible pores; the fibers are moveable and not permanently locked during wiping. The current foam-based eraser is micro-structurally rigid due to thermal setting plastics with fixed open cells and rigid open cells. An ideal solution incorporates these features; a tough stain wipe has been developed to include rigid micro pore or open cell structures on a wipe/towel's flexible cleaning surface. The key elements of the proposed solution are described herein.

Wipes can be made that a) laminate the thermal-setting nonwoven web with an already-formed rigid open cell surface microstructure to a supporting nonwoven or woven substrate, such as a hydroentangled web, or any other backing substrate; and b) wet-lay or air-lay staple thermal-setting fibers onto an already made or in-situ-formed backing substrate and then lock down the fibers to form the desired and rigid open cell microstructure by a thermal-setting binder polymer or a thermal-setting polymer coating.

Nonwoven backing substrates suitable for the disclosure include, but are not limited to, paper toweling, spunbond, meltblown, coform, air-laid, bonded-carded web materials, hydroentangled (spunlace) materials, combinations thereof, and the like. For example, the fibers from which the nonwoven material is made can be produced by the meltblowing or spunbonding processes, including those producing bicomponent, biconstituent or polymer blend fibers that are well known in the art. These processes generally use an extruder to supply melted thermoplastic polymer to a spinneret where the polymer is fiberized to yield fibers that can be staple length or longer. The fibers are then drawn, usually pneumatically, and deposited on a moving formations mat or belt to form the nonwoven fabric. The fibers produced in the spunbond and meltblown processes can be microfibers. Microfibers of the present disclosure are small diameter fibers having an average diameter not greater than about 75 microns, for example, having an average diameter of from about 0.5 microns to about 50 microns, or more particularly, microfibers can have an average diameter of from about 2 microns to about 40 microns.

Suitable substrates of the present disclosure can include a nonwoven fabric, woven fabric, knit fabric, or laminates of these materials. The substrate can also be a tissue or towel, as described herein. Materials and processes suitable for forming such substrate are generally well known to those skilled in the art. For instance, some examples of nonwoven fabrics that can be used in the present disclosure include, but are not limited to, paper toweling, spunbonded webs, meltblown webs, bonded carded webs, air-laid webs, coform webs, spunlace or hydraulically-entangled webs, and the like. In each case, at least one of the fibers used to prepare the nonwoven fabric is a thermoplastic material containing fiber. In addition, nonwoven fabrics can be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present disclosure is a nonwoven fabric.

If desired, the nonwoven fabric can also be bonded using techniques well known in the art to improve the durability, strength, hand, aesthetics, texture, and/or other properties of the fabric. For instance, the nonwoven fabric can be thermally (e.g., pattern bonded, through-air dried), ultrasonically, adhesively and/or mechanically (e.g. needled) bonded. For instance, various pattern bonding techniques are described in U.S. Pat. No. 3,855,046 to Hansen; U.S. Pat. No. 5,620,779 to Levy, et al.; U.S. Pat. No. 5,962,112 to Haynes, et al.; U.S. Pat. No. 6,093,665 to Sayovitz, et al.; U.S. Design Pat. No. 428,267 to Romano, et al.; and U.S. Design Pat. No. 390,708 to Brown.

The nonwoven fabric can be bonded by continuous seams or patterns. As additional examples, the nonwoven fabric can be bonded along the periphery of the sheet or simply across the width or cross-direction of the web adjacent the edges. Other bond techniques, such as a combination of thermal bonding and latex impregnation, can also be used. Alternatively and/or additionally, a resin, latex or adhesive can be applied to the nonwoven fabric by, for example, spraying or printing, and dried to provide the desired bonding. Still other suitable bonding techniques can be described in U.S. Pat. No. 5,284,703 to Everhart, et al., U.S. Pat. No. 6,103,061 to Anderson, et al., and U.S. Pat. No. 6,197,404 to Varona.

In another aspect, the substrate of the present disclosure is formed from a spunbonded web containing monocomponent and/or multicomponent fibers. Multicomponent fibers are fibers that have been formed from at least two polymer components. Such fibers are usually extruded from separate extruders but spun together to form one fiber. The polymers of the respective components are usually different from each other although multicomponent fibers can include separate components of similar or identical polymeric materials. The individual components are typically arranged in substantially constantly positioned distinct zones across the cross-section of the fiber and extend substantially along the entire length of the fiber. The configuration of such fibers can be, for example, a side-by-side arrangement, a pie arrangement, or any other arrangement.

When used, multicomponent fibers can also be splittable. In fabricating multicomponent fibers that are splittable, the individual segments that collectively form the unitary multicomponent fiber are contiguous along the longitudinal direction of the multicomponent fiber in a manner such that one or more segments form part of the outer surface of the unitary multicomponent fiber. In other words, one or more segments are exposed along the outer perimeter of the multicomponent fiber. For example, splittable multicomponent fibers and methods for making such fibers are described in U.S. Pat. No. 5,935,883 to Pike and U.S. Pat. No. 6,200,669 to Marmon, et al.

The substrate of the present disclosure can also contain a coform material. The term "coform material" generally refers to composite materials including a mixture or stabilized matrix of thermoplastic fibers and a second non-thermoplastic material. As an example, coform materials can be made by a process in which at least one meltblown die head is arranged near a chute through which other materials are added to the web while it is forming. Such other materials can include, but are not limited to, fibrous organic materials such as woody or non-woody pulp such as cotton, rayon, recycled paper, pulp fluff and also superabsorbent particles, inorganic absorbent materials, treated polymeric staple fibers and the like. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Additionally, the substrate can also be formed from a material that is imparted with texture one or more surfaces. For instance, in some aspects, the substrate can be formed from a dual-textured spunbond or meltblown material, such as described in U.S. Pat. No. 4,659,609 to Lamers, et al. and U.S. Pat. No. 4,833,003 to Win, et al.

In one particular aspect of the present disclosure, the substrate is formed from a hydroentangled nonwoven fabric.

Hydroentangling processes and hydroentangled composite webs containing various combinations of different fibers are known in the art. A typical hydroentangling process utilizes high pressure jet streams of water to entangle fibers and/or filaments to form a highly entangled consolidated fibrous structure, e.g., a nonwoven fabric. Hydroentangled nonwoven fabrics of staple length fibers and continuous filaments are disclosed, for example, in U.S. Pat. No. 3,494,821 to Evans and U.S. Pat. No. 4,144,370. Hydroentangled composite nonwoven fabrics of a continuous filament nonwoven web and a pulp layer are disclosed, for example, in U.S. Pat. No. 5,284,703 to Everhart, et al. and U.S. Pat. No. 6,315,864 to Anderson, et al.

Of these nonwoven fabrics, hydroentangled nonwoven webs with staple fibers entangled with thermoplastic fibers is especially suited as the substrate. In one particular example of a hydroentangled nonwoven web, the staple fibers are hydraulically entangled with substantially continuous thermoplastic fibers. The staple can be cellulosic staple fiber, non-cellulosic stable fibers or a mixture thereof. Suitable non-cellulosic staple fibers includes thermoplastic staple fibers, such as polyolefin staple fibers, polyester staple fibers, nylon staple fibers, polyvinyl acetate staple fibers, and the like or mixtures thereof. Suitable cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally are composed of derivatives of cellulose formed by substitution of appropriate radicals (e.g., carboxyl, alkyl, acetate, nitrate, etc.) for hydroxyl groups along the carbon chain.

One particularly suitable hydroentangled nonwoven web is a nonwoven web composite of polypropylene spunbond fibers, which are substantially continuous fibers, having pulp fibers hydraulically entangled with the spunbond fibers. Another particularly suitable hydroentangled nonwoven web is a nonwoven web composite of polypropylene spunbond fibers having a mixture of cellulosic and non-cellulosic staple fibers hydraulically entangled with the spunbond fibers.

The substrate of the present disclosure can be prepared solely from thermoplastic fibers or can contain both thermoplastic fibers and non-thermoplastic fibers. Generally, when the substrate contains both thermoplastic fibers and non-thermoplastic fibers, the thermoplastic fibers make up from about 10% to about 90%, by weight of the substrate. In a particular aspect, the substrate contains between about 10% and about 30%, by weight, thermoplastic fibers.

Generally, a nonwoven substrate will have a basis weight in the range of about 17 gsm (grams per square meter) to about 200 gsm, more typically, between about 33 gsm to about 200 gsm. The actual basis weight can be higher than 200 gsm, but for many applications, the basis weight will be in the 33 gsm to 150 gsm range.

The thermoplastic materials or fibers making-up at least a portion of the substrate can essentially be any thermoplastic polymer. Suitable thermoplastic polymers include polyolefins, polyesters, polyamides, polyurethanes, polyvinylchloride, polytetrafluoroethylene, polystyrene, polyethylene terephthalate, biodegradable polymers such as polylactic acid, and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(l-butene) and poly (2-butene); polypentene, e.g., poly(l-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof. These thermoplastic polymers can be used to prepare both substantially continuous fibers and staple fibers, in accordance with the present disclosure.

In another aspect, the substrate can be a tissue product. The tissue product can be of a homogenous or multi-layered construction, and tissue products made therefrom can be of a single-ply or multi-ply construction. In certain exemplary aspects, the tissue product can have a basis weight of about 10 g/m2 to about 65 g/m2, and density of about 0.6 g/cc or less. In other aspects, the basis weight can be about 40 g/m2 or less and the density can be about 0.3 g/cc or less. In still other aspects, the density can be about 0.04 g/cc to about 0.2 g/cc. Unless otherwise specified, all amounts and weights relative to the paper are on a dry basis. Tensile strengths in the machine direction can be in the range of from about 100 to about 5,000 grams per inch of width. Tensile strengths in the cross-machine direction are from about 50 grams to about 2,500 grams per inch of width. Absorbency is typically from about 5 grams of water per gram of fiber to about 9 grams of water per gram of fiber.

Conventionally pressed tissue and paper products and methods for making such products are well known in the art. Where appropriate, tissue and paper products are typically made by depositing a papermaking furnish on a foraminous forming wire, often referred to in the art as a forming wire. Once the furnish is deposited on the forming wire, it is referred to as a web. The web is dewatered by pressing the web and drying at elevated temperature. The particular techniques and typical equipment for making webs according to the process just described are well known to those skilled in the art. In a typical process, a low consistency pulp furnish is provided from a pressurized headbox, which has an opening for delivering a thin deposit of pulp furnish onto the former wire to form a wet web. The web is then typically dewatered to a fiber consistency of from about 7% to about 25% (total web weight basis) by vacuum dewatering and further dried by pressing operations wherein the web is subjected to pressure developed by opposing mechanical members, for example, cylindrical rolls. The dewatered web is then further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The formed sheets are considered to be compacted since the entire web is subjected to substantial mechanical compressional forces while the fibers are moist and are then dried while in a compressed state. In other aspects, the tissue or paper can be formed by creping as is known in the art.

One particular aspect of the present disclosure utilizes an uncreped through-air-drying technique to form the tissue product. Through-air-drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Ruqowski, et al.; U.S. Pat. No. 6,017,417 to Wendt, et al., and U.S. Pat. No. 6,432,270 to Liu, et al. Uncreped through-air-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-air-drying to remove the water from the fibrous web; and (4) removing the dried fibrous web from the traveling foraminous belt.

The nonwoven of the present disclosure can also be a multilayer laminate. An example of a multilayer laminate is an aspect wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al., and U.S. Pat. No. 4,374,888 to Bornslaeger. Such a laminate can be made by sequentially depositing onto a moving forming belt first a spunbond fabric layer, then a meltblown fabric layer and last another spunbond layer and then bonding the laminate in a manner described below. Alternatively, the fabric layers can be made individually, collected in rolls, and combined in a separate bonding step. Such fabrics usually have a basis weight of from about 0.1 to 12 OSY (ounces per square yard) (6 to 400 gsm), or more particularly from about 0.75 to about 3 OSY.

The addition of thermal-setting fibers to the backing substrate (e.g., nonwovens and the like) can be accomplished by at least two methods: affixing fibers to a nonwoven substrate, or forming a matrix of fibers, and then affixing that matrix to a nonwoven substrate.

Fibers suitable for the present disclosure are preferably selected from fiber families that are made from thermal-setting polymers. Fibers from thermal-setting polymers are potentially more rigid and more abrasive for surface contact and cleaning. Examples of such polymers include but are not limited to those listed in Table 1.

The fibers used in the examples below are made from thermal-setting melamine resins. Thermal-setting melamine fibers suitable for the present disclosure can either be continuous or staple fibers, such as the meltblown fibers described in U.S. Patent Application Publication No. 2009/0084400 to Quadbeck-Seeger, short-cut dry staple fibers from Basofil Inc., and short-cut wet staple fibers from Engineered Fiber Technology.

Meltblown thermal-setting melamine fibers and staple fibers can both be attached to backing substrates by laminating pre-made fiber webs with desired thicknesses and basis weights. Alternatively, meltblown webs or staple fiber webs can be formed directly onto pre-made or in-situ-made backing substrates in a continuos process. For example, a thermal-setting melamine staple fiber top layer can be formed onto an in-situ-formed pulp fiber web by introducing staple melamine fibers and pulp fibers from layered head boxes in traditional paper-making process, as shown in Example 6 and FIG. 8. From this example, pulp fiber web is introduced from a bottom headbox to form the pulp-fiber-rich backing substrate. Melamine fibers are then deposited from the top head box to the already-formed capture substrate. In this in-situ two-layer-forming example, the top melamine fiber layer can be as low as 3 GSM to as high as desired.

The thermal-setting fiber top layer preferably includes at least 70% or greater thermal-setting fibers by weight (i.e., binder fibers, binder coatings, and other added fibers should not exceed 30%). The thermal-setting fiber top layer can be as low as ~3-10 GSM to as high as ~30 GSM regardless of the basis weight of backing substrates. In some embodiments, a wipe can be constructed with ~100% thermal-setting fibers if the cost of the material is not a concern and the thermal-setting fibers are strong and flexible enough for a stand-alone cleaning article.

Uniformly mixing melamine fibers with other fibers (e.g., pulp fibers, synthetic fibers, etc.) to form a wipe with uniformly-distributed thermal-setting fibers within the whole wipe is not in the scope of the current disclosure. Laboratory work has demonstrated that mixing pulp fibers as well as other synthetic fibers from thermal plastics with ratios below 70% melamine fibers are not effective on some household surfaces in terms of tough stain removal with water (e.g., permanent marker ink marks). For example, a uniformly-formed wipe with 50% BASOFIL melamine fibers and 50% pulp fibers does not remove any significant amount of permanent marker ink marks from representative laminate floor surfaces such as commonly found in home improvement retail stores.

TABLE 1

Thermal-Setting Polymers

| Name | Properties | Applications and Uses |
|---|---|---|
| Urea formaldehyde | Strong, insulator, brittle, hard, stiff. | Electrical fittings, handles and knobs |
| Polyester resin | Liquid raw state, stiff hard, insulator, chemical resistance, brittle without fibre reinforcement. | Casting, bonding fibres (glass, Kevlar, carbon fibre) |
| Epoxy resins trade names include Araldite. | Good insulator, brittle chemical resistant. | Adhesives, bonding fibres, encapsulation. |
| Melamine formaldehyde | Hard, strong, heat resistant. | Adhesives, bonding fibres, encapsulation. |
| Polycarbonate | Hard, strong, transparent, high refractive index | Spectacle lenses |

Thermal-setting fiber webs attached to backing substrates as described herein are not enough for effective stain removal because rigid fibers can easily move around on the wipe during wiping motions on the surface, which leads to reduced friction between fibers and the surface to be cleaned. To take advantage of the fibers' rigidity, the fibers should be fixed to reduce or eliminate their movement during wiping. Fixing the fibers increases friction between fibers and the surface to be cleaned, thus improving cleaning performance. A rigid fixation mechanism needs to be incorporated into a wipe made with thermal-setting fibers to ensure maximum friction between fibers and surfaces. The rigid fixation mechanism can be additional polymer resin sprayed on the fibers to fix them together. Preferably, the fiber fixation materials are also selected from thermal-setting polymers to both fix the fibers and to prevent the fixation mechanism itself from moving during wiping.

The fiber-fixing step is critical for forming rigid microstructured open pores on the wipe's surface, particularly for staple thermal-setting fibers as these normally have limited affinity to each other and are also too rigid to be inter-locked together as with pulp or other synthetic fibers. Additionally, rigid fibers are prone to linting and breaking during wiping if the fibers are not properly locked onto the surface of a wipe.

Suitable fixing materials include the following: various Bi—Co binder fibers such as CoPET/PET T-201, T-203 from Fiber Innovation Technologies, various binder polyvinyl alcohols (PVA) fibers such as those from Engineered Fiber Technology, various latex polymers such as those from Celanese Emulsion Polymers, HYCAR and PERMAX brand emulsions from Lubrizol, emulsion polymers from Kraton, and, most preferably, the thermal-setting polymers such as melamine resins such as CYMEL 328 and CYMEL 385 resins from CYTEC, Inc.

To further reduce the linting of thermal-setting fibers from the top layer, a tacking treatment such as those commonly used in tack cloths for trapping dust particles from surfaces can be added to the fiber-fixing chemistries and materials described herein. The tacking treatments can be applied separately or together, depending upon the desired wipe surface properties. In one example of such a tack treatment, a poly-isobutylene (PIB) emulsion is applied to the thermal-setting fiber top layer to provide fiber fixing as well as tacky properties for linting reduction.

Thermal-setting fibers suitable for the present invention can be in various lengths and shapes. In some aspects, fibers can have movement fixation mechanisms between fibers before any further fixation treatment is applied. One example of such fibers is documented in U.S. Patent Application Publication No. 2010/0269318 to Panzer, et al., in which fibers have self-connecting branching points. A branching point is a point at which two or more fibers continuing in their respective longitudinal directions converge in one point and are physically connected to each other by merging. Fibers with such branching points are advantageous for the present disclosure as they provide an already built-in fiber fixation mechanism. At the same time, such branching points can help to hold brittle thermal-setting fibers together for preventing or at least reducing fiber linting during wiping.

A combination of thermal-setting melamine fibers with fiber branching units as well as additional fiber fixation treatment can be found in the melt-blown melamine fibers and nonwovens sheets available from OMPG/AP Fibre GmbH (Breitscheidstraße 97 07407 Rudolstadt—Thüringen, Deutschland/Germany), a German subsidiary unit of Borealis Group, Inc. of Port Murray, N.J. The thermal-setting melamine meltblown fibers and nonwovens from Borealis are different from others in that the Borealis fibers possess branching units (see U.S. Patent Application Publication No. 2010/0269318). Examples 3-6 describe various product forms using these fibers including using a melt-blown nonwoven made of melamine polymer with a fiber fixation treatment.

In some aspects of the disclosure, the thermal-setting fiber top layer can be disposed on both sides of the backing substrate.

In further aspects of the disclosure, the thermal-setting fiber top layer can be restricted to only parts of the backing substrate's surface. The restricted areas, such as a strip, square, circle, or the like, can be placed anywhere on the backing substrate surface and with any shapes or dimensions. Such samples can further reduce the cost of the wipe while still allowing enough tough stain removal areas for effective cleaning. The restricted tough stain removal areas can be color-coded or marked.

It was also found that the wipes of the present disclosure perform best when moist, and that the thermal-setting fibers possess a higher dielectric constant than cellulose and common thermoplastic synthetic fibers. Co-pending U.S. patent application Ser. No. 14/042,071 describes how the formation of a dielectric gradient from a wipe to a surface to be cleaned can be advantageous when the wipe is to be used with some added moisture.

The addition of moisture to the wipes described herein can be performed by a user when using the wipe for cleaning. Alternatively, moisture can be pre-added to the wipe with the amount of moisture added preferably not exceeding 200% in comparison to the wipe's weight such that the desired dielectric gradient can be maintained for cleaning.

It should be noted here that moisture in the thermal-setting melamine top layer can be significantly lower than the bottom substrate layer because melamine fibers are essentially a hydrophobic fiber and will force the added moisture to the hydrophilic side of the wipe. This forced moisture distribution actually helps to control moisture levels in melamine side so that a preferred dielectric gradient can be maintained.

In some aspects of the present disclosure, a surfactant can be added to hydrophobic thermal-setting fiber top layer to facilitate wetting the wipe.

Moisture content is calculated according to the weight ratios of added moisture and the dry weight of the article. For example, 10%, 100%, 200% moisture levels means that 0.1 gram, 1 gram, and 2 grams of water will be added to a dry article of 1 gram in weight.

EXAMPLES

The following test procedure is used to evaluate the stain-removal efficacy of the materials described herein, although similar tests can be done on any wipe material described in this disclosure.

Example 1. Demonstration of the Ineffectiveness of Tough Stain Removal from Hard Surfaces by Unmodified Paper Towels and Wipes (e.g., Cellulose Fiber Based SCOTT Brand and VIVA Brand Paper Towels and Hydroentangled WYPALL-X60 Wipes (~85% Pulp Fibers and ~15% Polypropylene Spunbond), all Available from Kimberly-Clark Corp.)

In this example, marks of permanent marker ink (SHARPIE brand permanent markers) were written onto various surfaces such as office desktops, tiles, and hardwood surfaces. The marks were left to dry for at least several hours at room temperature. After the stains were fully dried, the cleaning articles described herein were used for cleaning by first adding water to the wipe or by spraying water on the surface. Specifically, an unmodified WYPALL-X60 brand wiper was used. Except for very smooth and highly polished surfaces, the toweling and wipes without thermal-setting polymer fibers were not effective for removing the ink marks with routine cleaning and wiping. As shown in FIG. 1, only slight color intensity drops were observed in comparison to the control, mostly due to physical friction between the wipe and the surface.

Example 2. Demonstration of the Ineffectiveness of Only Thermal-Setting Fibers without Rigid Pore or Open Cell Structures in a Wipe Two types of cleaning articles were made for this example: Paper-like towel hand sheets and WYPALL-type hydroentangled wipes. The thermal-setting melamine fibers used in this example were purchased from Engineered Fibers Technology (for hand sheets, ~25-40% in a wet paste form) and Basofil Inc. (short-cut dry fibers at ~6-12 mm in length for WYPALL-type hydroentangled wipes). The paper-like hand sheets were made by a routine wet process with melamine fibers proportions up to 70% with pulp fibers making up the rest (100% melamine fiber sheets have no strength). WYPALL-type hydroentangled wipes with 100% melamine fiber as the top layer (~20 GSM) were made by hydroentangling melamine fibers from Basofil onto a premade 45 GSM WYPALL-type hydroentangled sheet (with 9 GSM spunbond). These paper-like hand sheets and WYPALL-type hydroentangled wipes were then used for permanent marker ink stain removal with the same procedure as described in Example 1. The cleaning efficacies observed for these cleaning articles are better than those observed in Example 1, but these hand sheets and wipes reach a removal efficacy of approximately 50 percent when compared to the performance of MR. CLEAN MAGIC ERASER melamine blocks available from The Procter & Gamble Company.

Figure 2:
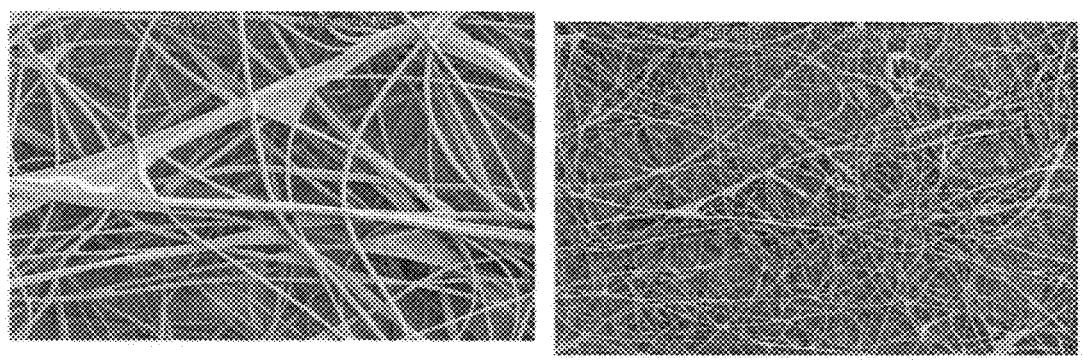
FIG. 2 illustrates in two scanning electron microscope (SEM) micrographs the surface structures of a wipe described in current disclosure with both thermal-settings fibers and fiber fixation treatment using a thermal-setting polymer.
Figure 3:
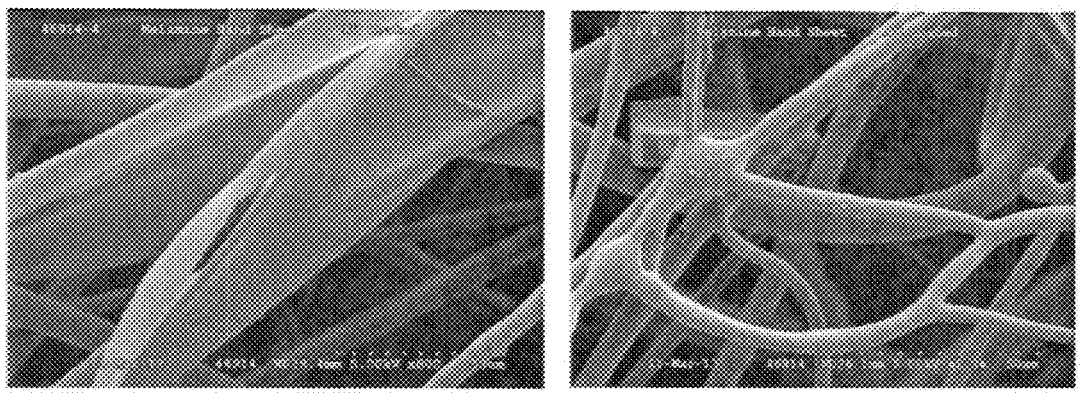
FIG. 3 illustrates in two SEM micrographs the thermal-setting fiber fixation treatment and thermal-setting fiber branching points as described in present disclosure.
Figure 4:
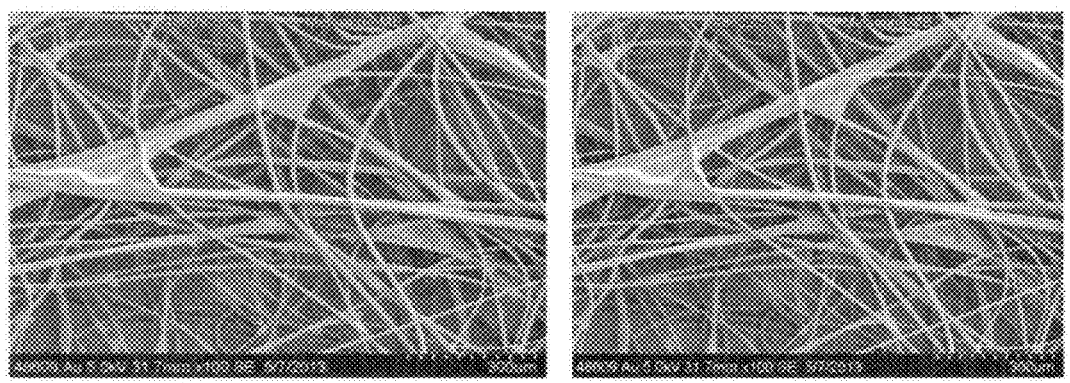
FIG. 4 illustrates in two SEM micrographs the highlighted branching points and intersection window areas of the present disclosure.
Figure 5:
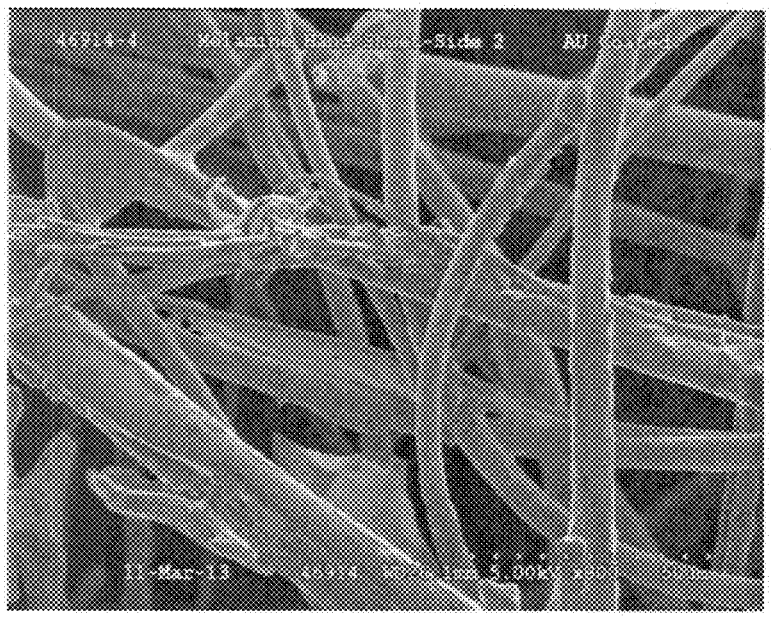
FIG. 5 illustrates in one SEM how the fiber fixation treatment forms knife-type fiber structures for enhanced cleaning.

Example 3. Demonstration of the Effectiveness of a Tough Stain Removal Wipe with a Rigid Pore or Open Cell Structures in the Wipe The effectiveness of tough stain removal by a wipe with rigid pore or open cell structures as described in the present invention has been successfully demonstrated for cleaning various tough stains (permanent marker ink marks, crayon marks, soup marks, toothpaste marks, bathroom limes, etc.) on various surfaces (glass, tiles, laminates, hardwood, walls, writing blackboards, stainless steel, etc.). All demonstrations were done using a wipe and adding only a small amount of water (<100% wipe weight). The wipe used for the demonstration is a 55 GSM nonwoven base sheet available from OMPG/Borealis. It is made with 100% melt-blown melamine fibers with an additional approximately 3 GSM fiber fixation treatment using the same thermal-setting melamine resin. The rigid pore or open cell surface structures (including fiber branching) of the wipe are shown in FIGS. 2, 3, and 4. The fiber fixation treatment also forms a knife type fiber structure for enhanced cleaning is shown in FIG. 5.

FIG. 2 illustrates the surface structures of a wipe described herein with both thermal settings fibers and fiber fixation treatment by a thermal setting polymer. FIG. 3 illustrates a close-up of thermal setting fiber fixation treatment and thermal setting fiber branching points as described in present disclosure. FIG. 4 illustrates the highlighted branching points and intersection window areas of the material. FIG. 5 illustrates the fiber fixation treatment forming a knife type fiber structure for enhanced cleaning.

Figure 6:
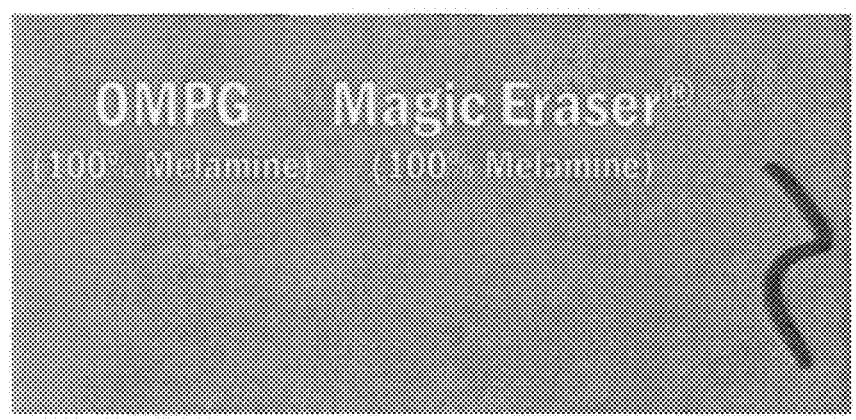
FIG. 6 illustrates permanent marker ink stain removal on a laminated plastic surface (office desktop) by wipes described in the present disclosure.
Figure 7:
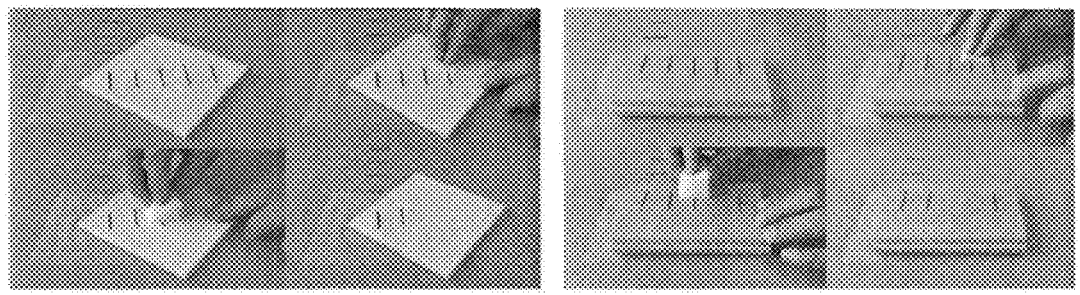
FIG. 7 illustrates permanent marker ink stain removal on a ceramic tile and a laminate floor surface by a wipe described in present disclosure.

For all demonstrations, wipes made as described herein are substantially better in cleaning efficacy than unmodified commercial paper/towels and also match the performance of MR. CLEAN MAGIC ERASER melamine blocks. FIGS. 6 and 7 are direct comparisons between MR. CLEAN MAGIC ERASER melamine blocks and the wipe described herein. FIG. 6 provides a demonstration of permanent marker ink stain removal from a laminated plastic surface (office desktop) by wipes described herein. FIG. 7 illustrates permanent marker ink stain removal on a ceramic tile and a laminate floor surface by a wipe described herein and by a MR. CLEAN MAGIC ERASER melamine block.

Example 4. Cleaning Articles with a Tough Stain Removal Top Layer

The wipe described in Example 3 can be made as thin as an approximately 10 GSM base sheet, but such a wipe lacks proper strength and is difficult to handle. A thin wipe can be made, however, by combining a thin rigid pore or open cell fiber top layer with a backing substrate, as demonstrated in this Example 4. The top layer in this example can be directly deposited on a backing substrate using a melt-blown process. The wipe can also be formed by laminating an already-made thin base sheet including thermal-setting fibers on a backing substrate. The backing substrate can be paper toweling, a wipe, a foam, and the like. Three representative backing substrates used for this Example 4 are a VIVA brand paper towel, a WYPALL-X60 wipe, and a Touch Screen Microfiber wipe, all available from Kimberly-Clark Corp. The top layer is a 20 GSM OMPG base sheet with 6 GSM additional fiber fixation treatment added. Testing showed the wipe with the OMPG base sheet cleaned better than wipes made with melamine fibers.

Such a construction provides a number of benefits including providing a wipe with a cleaning-enhanced surface and an opposite standard wiping surface. Such a construction also provides a cost savings; because thermal-setting fibers are more expensive than cellulose and other synthetic fibers, using only a thin layer of thermal-setting fibers on a backing substrate made with cellulose or other synthetic fibers can significantly reduce the wipe cost.

Example 5. Cleaning Articles with a Tough Stain Removal Strip or Areas

The top tough stain removal layer described in Example 4 can be further restricted to only part of the backing substrate's surface. In one execution, a strip of top layer can be laminated onto the backing substrate's surface. In another execution, the top layer can be placed in any part of a backing substrate's surface with any desired shapes and sizes. Such samples can further reduce the cost of the wipe while still having enough tough stain removal capabilities. The restricted tough stain removal areas can be color-coded or marked.

Figure 8:
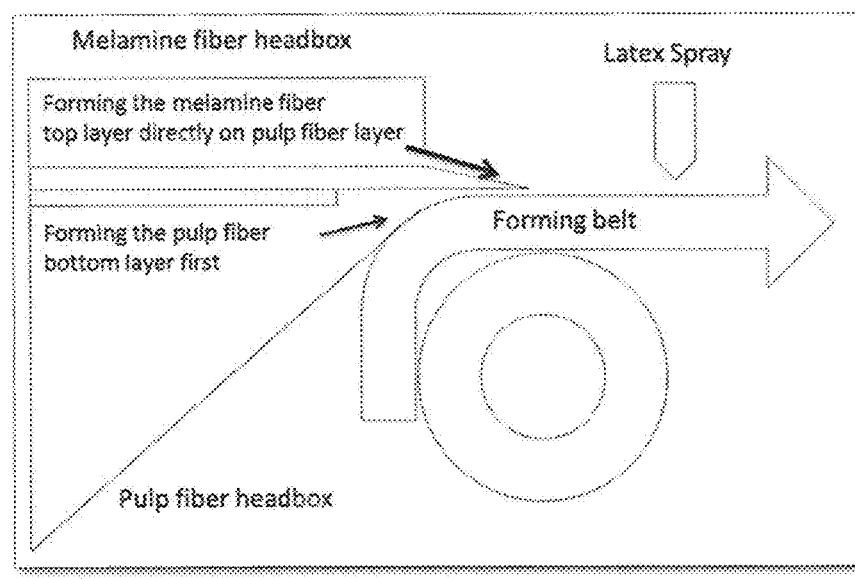
FIG. 8 schematically illustrates forming a thermal-setting fiber layer on the surface of a backing substrate in a continuous (in-situ) forming process.

Example 6. Forming a Thermal-Setting Fiber Layer on the Surface of a Backing Substrate in a Continuous (In-Situ) Forming Process As illustrated in FIG. 8, a thermal-setting fiber layer can be formed by a wet-laid process in which staple fibers for forming the bottom backing substrate layer and thermal-setting fiber layer are introduced in successive steps. The weight ratios of the top and bottom layers can be controlled by fiber loadings in fiber suspension tanks, flow speeds, and other related parameters. The adhesion between top and bottom fiber layers as well as fiber fixing for forming rigid microstructured open pores is next provided by first spraying (or flooding), followed by a vacuum suction to remove a thermal-setting polymer binder formulation. The resulted article is then transferred to a dry station before winding to a roll. In a specific example, staple melamine fiber layers (cutting length ~5-10 mm from Basofil, Inc.) at 3, 6, 10, 20, and 30 GSM have been successfully produced on top of a pulp fiber bottom layer (HP-11 from Buckeye Technologies Inc.).

Example 7. A Tough Stain Removal Kit

Wipes described in the present invention can be included in a cleaning kit with various tough stain removal articles for different surfaces. A water/formulation spray can also be included in the kit for providing a water/formulation source.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

We claim:

1. A nonwoven material comprising:
a nonwoven fabric backing substrate; and
a functional layer affixed to the nonwoven fabric backing substrate and having an outer surface opposite the nonwoven fabric backing substrate, the functional layer including thermal-setting fibers, wherein the thermal-setting fibers are rigidly fixed within the functional layer with a first rigid fixation mechanism, wherein the first rigid fixation mechanism is a polymer resin, wherein the thermal-setting fibers near the outer surface are rigidly fixed with a second rigid fixation mechanism comprising a thermal-setting polymer, and wherein thermal-setting fibers are exposed at the outer surface.

2. The nonwoven material of claim 1, wherein the functional layer is a nonwoven web including thermal-setting fibers, and wherein the nonwoven web is affixed to the nonwoven fabric backing substrate.

3. The nonwoven material of claim 1, wherein the thermal-setting polymer comprises melamine.

4. The nonwoven material of claim 1, wherein the nonwoven fabric backing substrate includes cellulosic material.

5. The nonwoven material of claim 1, wherein the nonwoven fabric backing substrate includes polymeric material.

6. The nonwoven material of claim 1, wherein the thermal-setting fibers are melamine.

7. The nonwoven material of claim 1, wherein the nonwoven fabric backing substrate is selected from the group consisting of microfiber, paper toweling, and a nonwoven wipe.

8. The nonwoven material of claim 1, wherein the nonwoven fabric backing substrate has a first surface, and wherein the functional layer is affixed to only a portion of the first surface.

9. The nonwoven material of claim 1, further comprising water.

10. The nonwoven material of claim 1, wherein the second rigid fixation mechanism is sprayed on the outer surface of the functional layer.

11. The nonwoven material of claim 1, wherein the first rigid fixation mechanism and the second rigid fixation mechanism are not the same.

12. The nonwoven material of claim 1, wherein the functional layer is affixed to the nonwoven fabric backing substrate by being laminated to the nonwoven fabric backing substrate or being formed directly onto the nonwoven fabric backing substrate.

* * * * *